Aug. 5, 1930.                C. H. SMOOT                1,772,403
                              REGULATOR
                          Filed Jan. 12, 1928
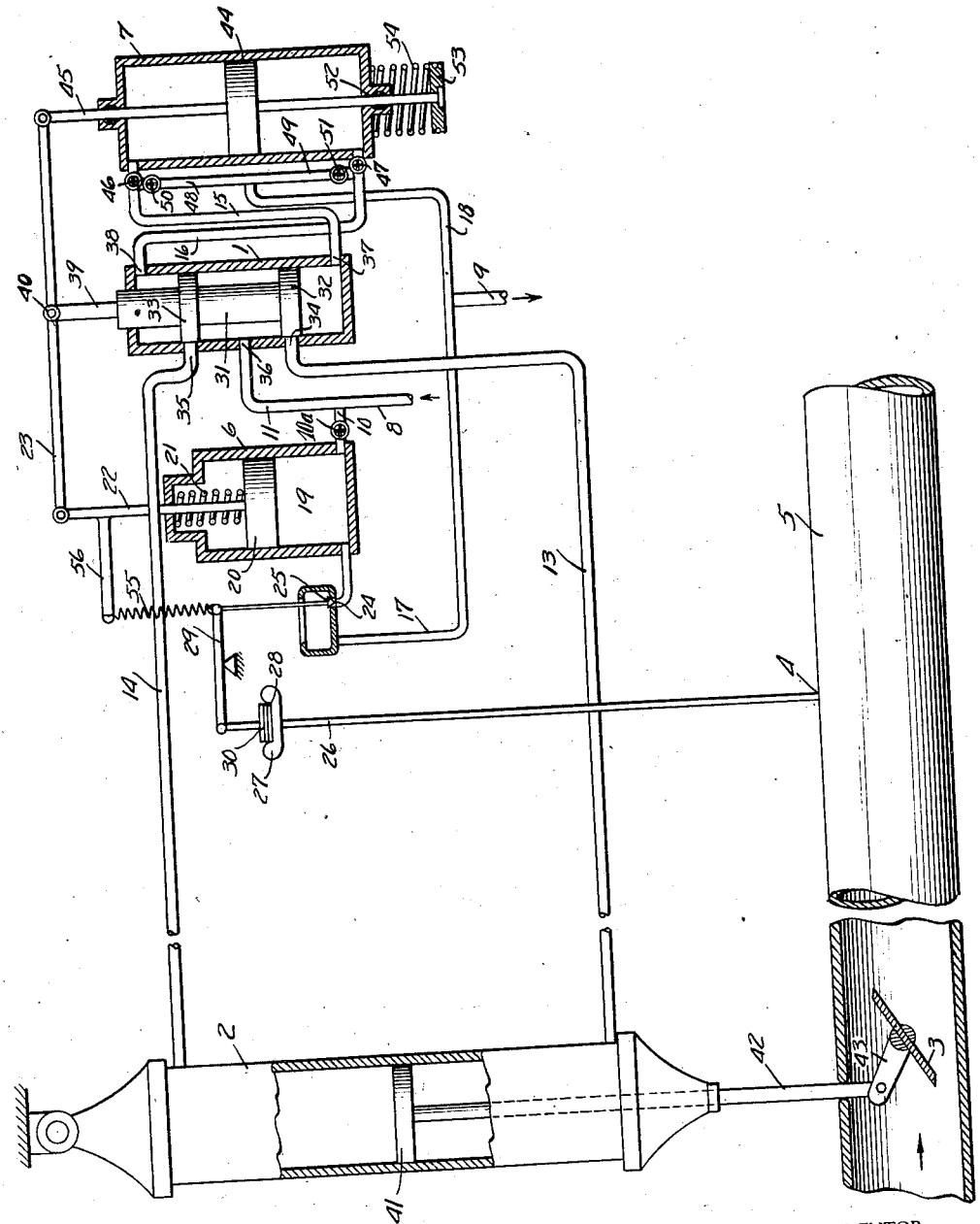
INVENTOR
Charles H. Smoot
BY
ATTORNEYS Patented Aug. 5, 1930

1,772,403

UNITED STATES PATENT OFFICE

CHARLES H. SMOOT, OF MAPLEWOOD, NEW JERSEY

REGULATOR

Application filed January 12, 1928. Serial No. 246,149.

My invention is concerned with the art of regulation and consists essentially in a novel regulator actuated by fluid pressure and designed for economical, rapid and positive operation.

My regulator is of the type wherein a pilot valve moving in response to a regulating force whether constant or variable and to a force varying as a function of the element regulated controls the delivery of actuating fluid to and from a relay device and the relay device effects the movement of the damper, throttle or other regulating means.

My invention is concerned primarily with the control of the pilot valve. If the pilot valve in a regulator of this type is controlled solely by the regulating force or forces and is not affected by the resulting movement of the controlling means, or relay, hunting of the regulator will occur due to unavoidable over or under travel of the controlling means and the resultant effect on the regulating force which varies as a function of the element controlled. To avoid this hunting of the regulator a mechanical connection, such as a weighted chain has been used between the relay and the pilot valve to transmit to the pilot valve a force varying with the movement of the controlling means and opposing the action of the regulating forces. According to my invention I employ no such mechanical connection between the relay device and pilot valve but effect the function it effects and other important advantageous functions by utilizing the fluid exhausting from the relay to react upon the control of the pilot valve. This I accomplish by the provision of a second relay cylinder located in proximity to the pilot valve and operated by the fluid exhausting from the main relay cylinder to make the piston of the second relay cylinder move in timed relation with that of the main cylinder. I then connect the piston rod of the second cylinder to the piston rod of the pilot valve and to its controlling means by a floating lever to operate the pilot valve in a well-known manner. Further, I provide means for slowly returning the piston of the secondary cylinder to its mid position after any movement thereof.

The operation is such that the initial movement of the piston of the secondary relay cylinder temporarily arrests the relatively rapid movement of the damper or other controlling means just prior to the attainment of the balanced state, while the return motion of the piston of the secondary cylinder to its mid position effects a slower and further movement of the damper to its final position.

For a better understanding of my invention and of the advantages pertaining thereto, reference should be had to the accompanying drawing in which I have illustrated one specific embodiment of my invention applied to the regulation of a fluid pressure.

In the drawing a pilot valve 1 controls the delivery of actuating fluid to a relay cylinder 2 which in turn directly controls the position of a damper 3. In the particular application illustrated the damper is controlled in such a way as to maintain a constant pressure at the point 4 in the conduit 5. At 6 is illustrated a spring loaded regulating device moved in response to variations in the pressure of fluid in conduit 5 and actuating the pilot valve. A second relay cylinder 7 also controls the pilot valve. Actuating fluid for the regulating device 6 and for the relay cylinders enters the system through a pipe 8 from any available source of fluid pressure, and is drained from the system through a pipe 9. The pipe 8 has branching therefrom two pipes 10 and 11, the former of which, provided with a throttling device 10$^a$, supplies actuating fluid to the device 6 and the latter of which leads to the pilot valve 1 from which actuating fluid is supplied to either end of the relay cylinder 2 through pipes 13 and 14 and to the secondary cylinder 7 through pipes 15 and 16. The fluid exhausts from the device 6 through pipe 17 connecting with the drain 9 and from the relay cylinders through pipe 18 likewise connecting with the drain 9.

The device 6 may be any desired type of spring or weight loaded regulator. In the particular embodiment illustrated it comprises a chamber 19 within which is a piston 20 acted upon by a spring 21 exerting a downward thrust against the pressure of the fluid beneath the piston. A piston rod 22 transmits the motion of the piston 20 to a floating lever 23 to which it is linked. The fluid pressure in the chamber 19 is controlled by the leakage permitted through a port 24 which leakage is determined by the position of a needle valve 25. The needle valve is in turn controlled by the pressure in the conduit 5 transmitted through a pipe 26 to a chamber 27 closed by a diaphragm 28. Movement of the diaphragm 28 causes corresponding movement of the needle valve 25 through the pivoted lever 29 to which each is attached by means of suitable rods. When the apparatus is used for the maintenance of a constant pressure in the conduit 5, the pressure in the chamber 27 is opposed by a constant force such as the weights 30. These weights 30 could of course be replaced by any other controlling force acting upon the lever 29, either variable or constant, as desired.

The pilot valve 1 may be of any desired construction. As illustrated, it comprises a piston 31 having projections 32 and 33 adapted, when the piston is at its mid-position, to close outlet ports 34 and 35 respectively. Supply pipe 11 leads to an inlet port 36 and pipes 13 and 14 lead to ports 34 and 35 respectively. At either end of the valve 1 and located beyond the ends of the piston 31 are ports 37 and 38 communicating with the pipes 15 and 16 respectively. To the piston 31 is connected a piston rod 39 linked at 40 to the lever 23.

The relay cylinder 2 contains a piston 41 carried by a rod 42 which rod is directly connected to the damper 3 through a lever 43. The pipes 13 and 14 lead to the interior of the relay cylinder at opposite sides of the piston 41.

The secondary relay 7 may be of similar construction and as shown contains a piston 44 carried by a rod 45 linked at one end to the floating lever 23. The pipes 15 and 16 lead to the interior of the cylinder at opposite sides of the piston 44. These pipes are provided with manually adjustable throttling valves 46 and 47 respectively, and with branch pipes 48 and 49 respectively leading to the pipe 18. Manually adjustable throttling valves 50 and 51 control the flow of fluid through the branch pipes 48 and 49. To provide means for gradually returning the piston 44 to its mid position within the secondary relay cylinder, after any movement thereof, the rod 45 is extended through the piston 44 and through a stuffing box and bearing 52 in the end wall of the casing of the cylinder 7 and terminates in a grooved head 53 adapted to firmly hold one end of a spring 54,—the other end of which bears against the cylinder casing.

To prevent over travel of the piston 20 and to insure the return thereof to its normal or mid position, a spring 55 is connected between the lever and a member 56 carried by the piston rod 22. The effect of this spring 55 on the operation of the device will be made clear hereinafter.

The apparatus as a whole operates upon a change in pressure at the point 4 to move the damper 3 rapidly in a direction to correct for this change of pressure; this rapid movement of the damper being normally almost but not quite sufficient to restore the pressure to that desired. The apparatus then proceeds to slowly move the damper the remaining distance necessary for the complete restoration of a balance. Sensitive and rapid response is thus obtained and yet hunting is avoided. A detailed description of the operation follows:

With no change in pressure at the point 4, and with the apparatus properly adjusted the damper 3 will be in a fixed position, the piston 41 being stationary and the positions of the pistons 20, 31 and 44 being as shown, with the floating lever 23 in a horizontal position. If, now, the pressure at the point 4 increases beyond that desired, the first effect will be a slight clockwise rotation of the lever 29 due to the increase in pressure in the chamber 27, and a resultant decrease in the leakage permitted through port 24. This decrease in leakage will cause the pressure within chamber 19 to build up sufficiently to raise the piston 20 against the tension of the spring 21. The upward movement of the piston 20 will be transmitted through rod 22 to lever 23 which will rotate about rod 45 as a pivot. The upward movement of the rod 22 will raise the member 56 and thus increase the tension of the spring 55 which adds a temporary force to the lever 29, in this case acting in the same direction as the weights 30, and tending to restore the balance of forces to the lever 29 prior to the complete return of the pressure in conduit 5 to that desired. The movement of the lever 23 lifts the piston 31 of the pilot valve, uncovering the ports 34 and 35 to put the pipe 14 into communication with the supply pipe 11 and the pipe 15 into communication with the pipe 13. Actuating fluid then flows through the pipe 14 into the relay cylinder 2 above the piston 41 to move the piston downward in a direction to partially close the damper 3. As the piston moves downward fluid will exhaust from beneath it into the pipe 13, through ports 34 and 37 into pipe 15 from which some of the fluid will enter the secondary cylinder 7 above the piston 44 and some will pass from the system through the pipes 48, 18 and 9; the relative amount entering the secondary cylinder depending upon the relative adjustments of the valves 46 and 50. That part of the fluid which enters the secondary cylinder 7 will move the piston 44 downward against the tension of the spring 54. The downward movement of the piston 44 will cause the lever 23, rocking on the rod 22 as a pivot, to lower the piston 31 of the pilot valve until the projections 32 and 33 again cover the ports 34 and 35, thus arresting the movement of the piston 41 and damper 3. During the closing movement of the damper 3 there is a gradual decrease in the pressure at the point 4, and in the chamber 27, to some new value depending upon the new position of the damper 3. This decrease in pressure which lags slightly behind the damper movement permits the gradual return of the piston 20 toward its original position and the consequent reduction of the added force of the spring 55 upon the lever 29. The necessary slight further opening of the damper 3 to bring about the complete restoration of the original condition is effected by the spring 54 slowly returning the piston 44 to its mid position and thus slightly lifting the piston 31 of the pilot valve to permit a further slight movement of the relay piston 41 and the damper controlled thereby. The complete restoration of the pressure at the point 4 to that desired insures the complete return to mid position of the piston 20, and the removal of the force on the lever 29 due to spring 55. The apparatus will thus be restored to equilibrium with pistons 20, 31 and 46 at their mid positions and the pilot valve thus closed.

Upon a decrease in pressure at the point 4 the reverse operation occurs. The weight 30, overbalancing the pressure in chamber 27, moves the lever 29 to reduce the leakage through port 24 thus permitting spring 21 to lower the piston 20 and to rotate the lever 23 causing a rapid partial opening of the damper and a temporary force to be applied to the balance 29 by the spring 55, in this case in a direction to oppose the weights 30. The actuating fluid exhausting from the cylinder 2 will raise the piston 44 of cylinder 7 thus causing it to close the pilot valve to arrest the movement of the damper. The gradual return of the piston 44 to its mid position under the influence of spring 54 and the return of the piston 20 as the pressure in chamber 27 increases, results in the slight further opening of the damper followed by the complete restoration of a balance upon lever 29 with the desired pressure at the point 4 in the conduit 5.

From the above description it will be apparent that the piston of the secondary relay cylinder 7 will initially duplicate the movement of the piston of the relay cylinder 2 both in direction and in relative magnitude of motion, thus affording the means for utilizing the flow of fluid from the relay cylinder 2 to replace any mechanical connection between the relay cylinder 2 and the pilot valve. The provision of the spring 54 insures that the piston 44 will later return to its mid position to be ready for any further regulation to be effected and to permit the return of the lever 23 to its horizontal position.

It will be apparent that the magnitude of the pressure change at the point 4 will determine to a great extent the duration of the opening of the pilot valve. A slight change in pressure for instance at the point 4 will result in only a partial opening of the pilot valve, a slight shift in the damper position and a rapid closure of the pilot valve by the piston of the secondary relay cylinder. Conversely, a large pressure variation will result in a larger movement of the damper and a longer opening of the pilot valve before it is automatically closed.

With the older type of regulator in which a fluid actuated relay cylinder controlled by a pilot valve was employed, the provision of a mechanical connection between the piston of the relay cylinder and the pilot valve, only partly eliminated undesirable hunting because of the absence of any means to arrest rapid movement of the regulator prior to the restoration of a balance. It did however insure proportionate movement of the relay piston and the spring or weight loaded regulator responsive to a function of the element controlled. By the provision of the secondary relay cylinder with the means for actuating its piston by the fluid exhausting from the primary cylinder, I have been able to procure all of the advantages of the mechanical connection of the prior art without its inherent disadvantages and with added results. By the further provision of the means for returning the piston of the secondary cylinder to its mid position and its effect upon the pilot valve I have been able to introduce into the system the means for giving to the damper or other controlling means, the slight further movement above described, which adds features of rapidity combined with stability not formerly obtained in this type of regulator.

In the proper operation of the device it is obvious that the valves 46, 47, 50 and 51 will be adjusted to permit fluid to pass with less resistance through valves 46 and 47 than through valves 50 and 51 to insure the proper use of the secondary relay cylinder. These valves permit of wide adjustment of the time response of the various elements and their most favorable settings will be determined by trial and will depend upon the relative dimensions of the two relay cylinders and upon the distance between the damper or other controlling means and the point such as 4 at which the function of the element controlled is measured. The preferred adjustment of these valves will also depend upon the type of element controlled, as there is a greater inherent time delay involved in the control of blowers, turbines, etc. than in the control of throttle valves or dampers.

I have now described one application of my invention, viz: the control of a damper for maintaining a constant pressure at a point in a fluid flow. My invention is not concerned, however, with this particular application of the regulating system. It is adapted to be used in connection with the control of any regulating means, such as the damper 3, by a controlling force, in this case the weights 30, and by a force varying as a function of the element controlled, in this case the pressure at the point 4. The particular construction of the device 6 is likewise immaterial to my invention. Any spring or weight loaded regulater which is moved in response to the controlling forces and is adapted to cooperate with such mechanism as the floating lever 23 will serve the purpose of the device 6.

Any suitable fluid may be used for actuating the various elements such as oil, or water, under pressure.

My invention is particularly useful when applied to the control of an element far removed from the point where the force varying as a function of the element controlled is measured where there is of necessity a considerable delay between the adjustment of the element and the reaction felt by the apparatus due to such adjustment. In so far as I am aware I am the first to use the flow of actuating fluid from a relay cylinder as a reactive control upon the regulation, and as such do not wish my invention to be considered as limited to the precise arrangement illustrated except in so far as my claims are so limited.

I claim:

1. In a regulating system of the type wherein a pilot valve controls the delivery of actuating fluid to a relay cylinder and the relay cylinder operates a controlling member and wherein the movable members of said cylinder and valve are mechanically independent, means for utilizing the flow of actuating fluid exhausting from the relay cylinder to react upon the control of the pilot valve.

2. In a regulating system of the type wherein a pilot valve operated in response to controlling forces, one of which is a force varying as a function of the element controlled, controls the delivery of actuating fluid to a relay cylinder, and the relay cylinder operates a controlling member, means for utilizing the flow of actuating fluid exhausting from the relay cylinder to create a fluid pressure to react upon the control of the pilot valve in opposition to said controlling forces.

3. In a regulating system, a regulator moved in response to controlling forces one of which is a force varying as a function of the element controlled, a controlling member, a relay cylinder for operating said member, a pilot valve for delivering actuating fluid to said cylinder, a second relay cylinder located in proximity to said valve and to said regulator and actuated by the fluid exhausting from said first relay cylinder, and a floating lever having separately linked thereto the movable members of said regulator, said pilot valve and said second relay cylinder.

4. In a regulating system of the type wherein a pilot valve controls the delivery of actuating fluid to either end of a distant relay cylinder to move the piston therein, and said piston actuates a controlling member, a second relay cylinder located in proximity to said pilot valve and also having a piston therein, means for utilizing the flow of fluid exhausting from said first cylinder to cause the piston of said second cylinder to initially imitate the movement of the piston of said first relay cylinder, and means for reacting upon the control of said pilot valve by the movement of said piston of said second relay cylinder.

5. Apparatus as in claim 4 including means for gradually returning the piston of said secondary cylinder to its mid position after any movement thereof.

6. Apparatus as in claim 4 including means for adjusting the relation between the magnitudes of the movements of said two pistons.

7. In a regulating system of the type wherein a pilot valve controls the delivery of actuating fluid to either end of a distant relay cylinder to move the piston therein, and said piston actuates a controlling member, the combination including a second relay cylinder also having a piston therein, means for utilizing the flow of fluid exhausting from said first cylinder to cause movement of the piston of said second cylinder, a regulator responsive to variations from a desired value of a force varying as a function of the element controlled, means for opening said pilot valve by said regulator upon a variation in said force from a desired value and to close the same by the movement of the piston of said second relay cylinder prior to the return of said force to the desired value, and means associated with said second cylinder for giving the pilot valve a further opening to effect the complete return of said force to its desired value.

In testimony whereof, I have signed my name to this specification.

CHARLES H. SMOOT.